United States Patent [19]

Cooper

[11] Patent Number: 4,532,541
[45] Date of Patent: Jul. 30, 1985

[54] APPARATUS AND METHOD FOR CORRECTING TIMEBASE ERRORS

[76] Inventor: J. Carl Cooper, 1373 Sydney, Sunnyvale, Calif. 94087

[21] Appl. No.: 420,597

[22] Filed: Sep. 20, 1982

[51] Int. Cl.³ .............................................. H04N 5/14
[52] U.S. Cl. .................................... 358/21 R; 358/320; 358/337; 358/37; 360/36.1; 307/607
[58] Field of Search ............. 358/324, 325, 320, 21 R, 358/315, 337, 339, 31, 37, 166; 360/36.1; 307/590, 591, 607; 377/57, 58, 63

[56] References Cited

U.S. PATENT DOCUMENTS 4,074,307 2/1978 Dischert et al. .................... 358/337
4,096,516 6/1978 Pritchard .............................. 358/31
4,134,029 1/1979 Bright et al. ........................ 307/591
4,217,605 8/1980 Carnes et al. ........................ 358/31
4,317,958 3/1982 Hamaguchi et al. ............... 307/607

Primary Examiner—Michael A. Masinick
Attorney, Agent, or Firm—Paul L. Hickman

[57] ABSTRACT

Improvements to timebase correction devices utilizing clocked analog delay lines are shown. Problems of clocked analog delay lines such as timing errors in the phase of internal sample and holds with respect to their clock, drifting of the gain and offset, and high frequency noise are corrected by use of external sample and hold circuits, external delays, automatic gain and offset circuits and high frequency preemphasis circuits.

18 Claims, 3 Drawing Figures

TO OTHER CKTS.   TO OTHER CKTS.

1 is still writing, hold read on 3

APPARATUS AND METHOD FOR CORRECTING TIMEBASE ERRORS

BACKGROUND OF THE INVENTION

1. Field of the Invention.

This invention relates to an improved method and apparatus for correcting flutter, otherwise known as timebase error of a television video or similar type of signal.

2. Description of the Prior Art.

Several devices, commonly known as timebase correctors, which correct flutter or timing errors are currently being manufactured. Many of these devices utilize digital memory along with analog to digital (A-D) and digital to analog (D-A) conversion of the signal being processed in order to facilitate use of the digital memory. One such invention is described in U.S. Pat. No. 3,860,952. Other inventions such as U.S. Pat. No. 3,763,317 utilize a high frequency carrier which is modulated by the video signal, the carrier may be delayed by various combinations of fixed and variable delay lines, and subsequently demodulated to recover a stable video signal.

With improvements in Charge Coupled Device (CCD) and Bucket Brigade Device (BBD) technology, analog shift register IC's such as those manufactured by Fairchild (Part No. CCD-321) and Plessy (Part No. MS 1003) are being used in new timebase correctors, such as the inventions disclosed in U.S. Pat. Nos. 3,959,815 and 4,150,395. The inventive concept of these products involves the use of a variable frequency clocking signal to the CCD device in order to change the delay time of the video signal being passed through the device in order to compensate for timing errors.

All of the above techniques, while being workable, have shortcomings. With the digital technique the cost of the A-D and D-A circuitry is very high. The modulated carrier systems utilize expensive delay lines and require the use of difficult to design and align modulator and demodulator circuitry. The variable frequency clocked CCD technique is not well suited for handling large timebase errors, and compensating for sin x/x frequency losses, which change as the CCD clocking frequency changes, can be very difficult.

One invention which can overcome all of the above problems is described in U.S. Pat. No. 3,931,638. This invention utilizes time multiplexing of two CCD analog delay lines thus taking advantage of the low power consumption and relative low cost of CCD's. In addition, the use of a clocking frequency which is locked to video synchronizing pulses will eliminate the sin x/x frequency loss problem associated with the variable frequency CCD approach. The above identified disclosure does suggest that more than two CCD devices can be utilized for improved error correction capability, however the disclosure does not make any mention of the problems which will arise, such as matching multiple devices, when such an improvement is made.

It should be noted here that the device disclosed in U.S. Pat. No. 3,931,638 is not capable of handling any timing errors on continuous signals with currently available CCD devices. With the currently available devices, it is not possible to read and write at the same time since only one clock input is available. Therefore with only two CCD's when one is filled it is not possible to start filling the other until the other is completely empty. In this situation the input signal will have to be stopped or else it will be missed. Of course it would be possible to arrange the timing of the system so that the filling of each CCD takes place during blanking since the sync and blanking periods can be reinserted on the output side of the CCD.

Two further inventions disclosed in U.S. Pat. Nos. 4,206,478 and 4,206,479 make use of special parallel-transfer CCD devices for timebase correction, however these special devices are much more complex and therefore more costly to manufacture than the normal CCD shift register devices.

The above identified inventions will also suffer from the same matching problems when using multiple devices as will U.S. Pat. No. 3,931,638, which matching problems are not identified or otherwise addressed.

SUMMARY OF THE INVENTION

The improved video timebase error correcting apparatus and method described herein provides an input processing circuit responsive to an input signal, a clocked analog delay circuit responsive to said input processing circuit and having at least three clocked analog shift register paths and a multiplexing circuit for coupling input and output clocking signals from said input processing and an output processing circuit to each analog shift register path at the appropriate time and said output processing circuit responsive in turn to said analog shift register paths to output a timebase corrected version of the input signal. Improvements in above circuitry are shown which improvements allow a plurality of analog shift register paths to be utilized for correcting continuous or noncontinuous input signals without introducing artifacts due to differences in said shift register paths. Further improvements are shown which allow said apparatus to operate with timebase errors in excess of the range of the clocked analog delay circuit with a minimum of disturbance to the corrected signal.

DESCRIPTION OF THE PREFERRED EMBODIMENT

Figure 1:
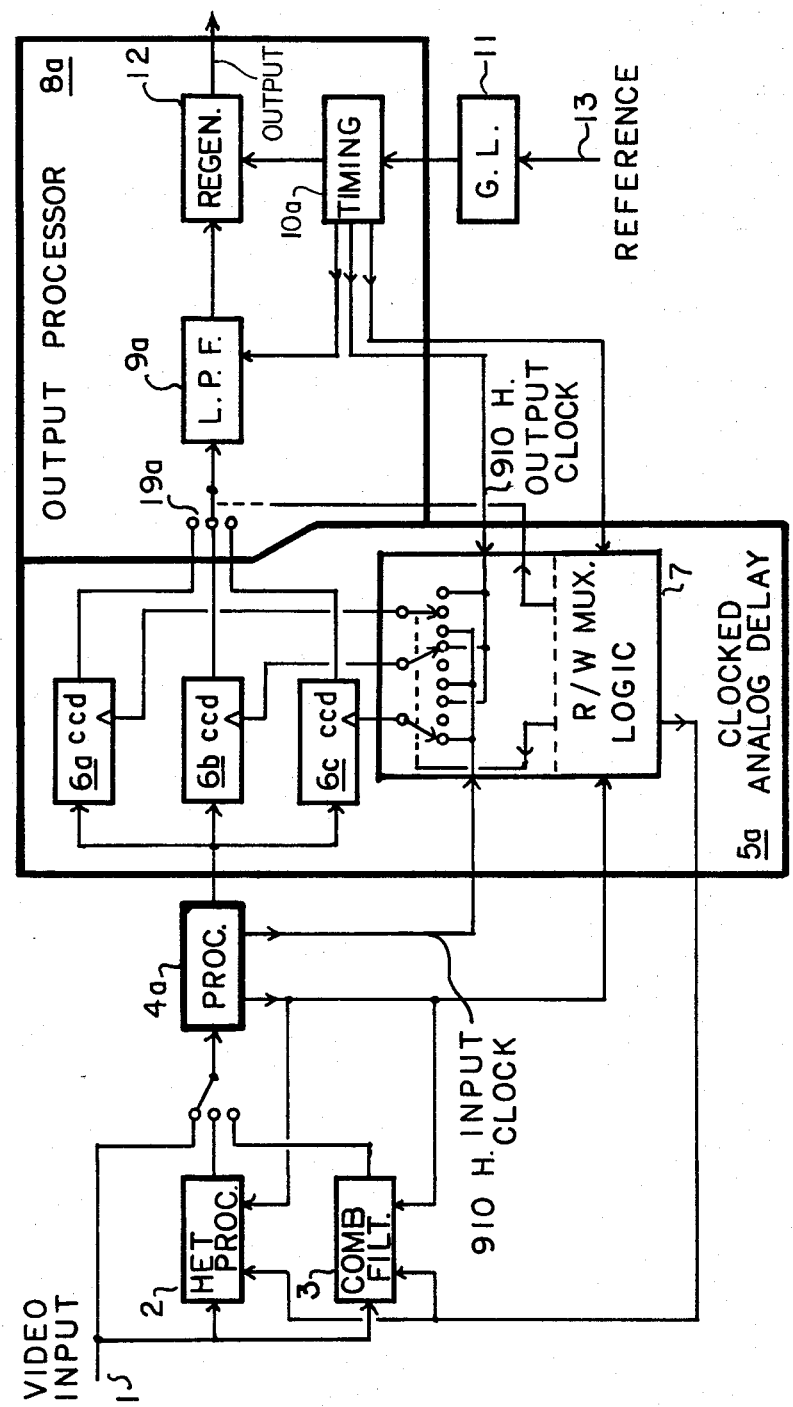
FIG. 1 is a block diagram of a typical video timebase corrector showing optional circuitry.

FIG. 1 is a block diagram of a typical video timebase corrector (TBC) configuration which may utilize the invention, showing video input 1, optional heterodyne color processor circuitry 2, optional comb filter 3, input processor circuitry 4a, clocked analog delay circuit 5a containing three CCD analog shift registers 6a, b, c and multiplexing circuit 7, output processing circuit 8a containing low pass filter 9a, timing generator 10a and CCD output selector 19a, optional output processing circuitry 12 and optional genlock circuitry 11 having external reference 13.

Figure 2:
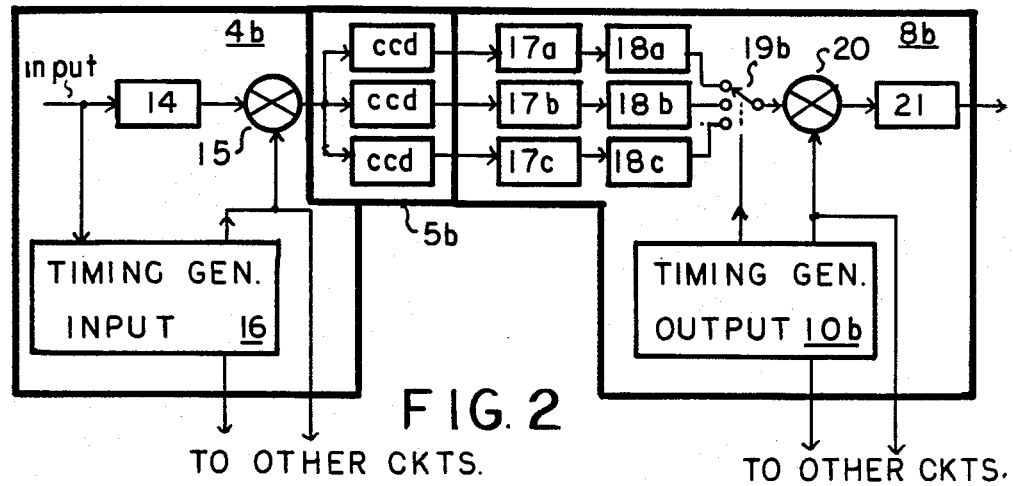
FIG. 2 is a block diagram of typical input and output processing circuitry.

FIG. 2 is a more detailed block diagram of the input processor 4b corresponding to 4a of FIG. 1, having lowpass filter 14, sample and hold 15, and timing generator 16, clocked analog delay 5b, output processor 8b corresponding to 8a to FIG. 1 having delay networks 17a, b, and c, AGC circuits 18a, b and c, output selector 19b, sample and hold 20, low pass filter 21 and output timing generator 10b corresponding to 10a.

Figure 3:
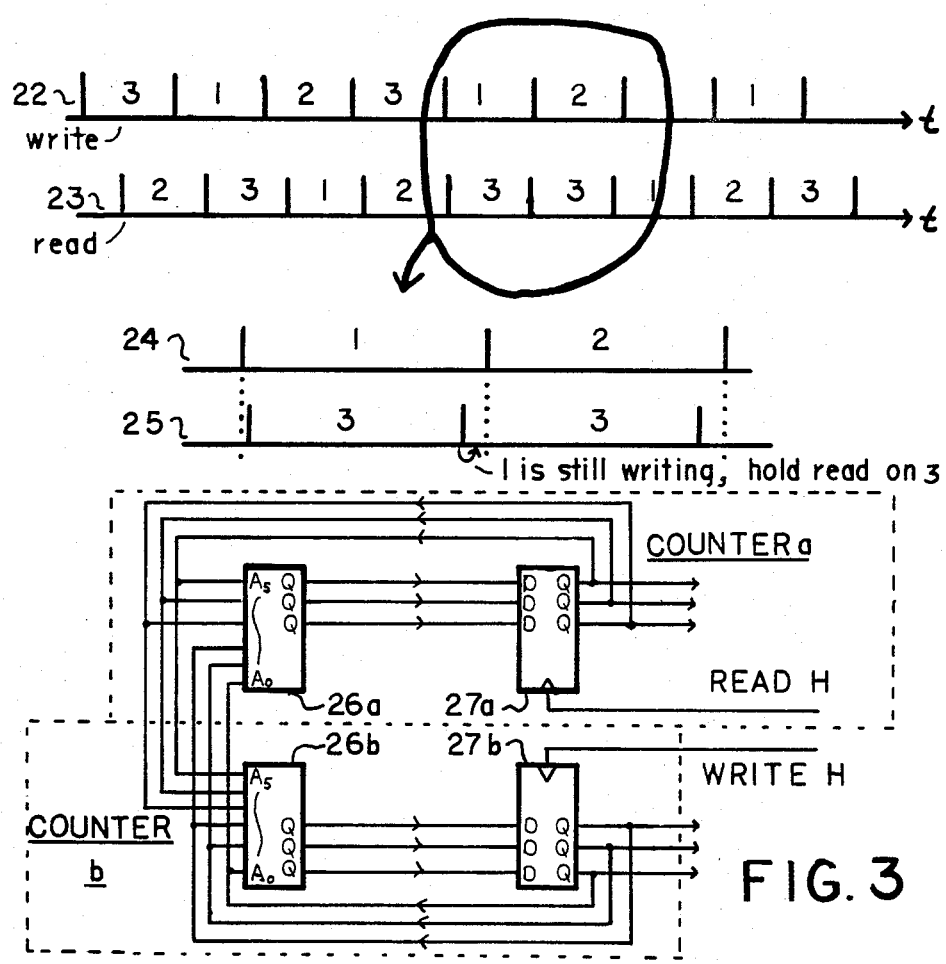
FIG. 3 is a diagram of operation of the multiplexing circuit.

FIG. 3 shows a simplified schematic and state diagram for a multiplexer circuit corresponding to 7 of FIG. 1 with write sequence 22, read sequence 23, detailed write and read state diagrams 24 and 25 respectively, read and write programmable memories 26a and b, read and write D flip-flop 27a and b.

In operation input video at 1 of FIG. 1 is applied to input processor 4a which provides proper conditioning of the video signal which signal is then passed to clocked analog shift register 5a at CCD inputs 6a, b and c. As part of the proper conditioning of the input video signal, optional circuits such as 2 and 3 may be used to make such corrections and processing on said input signal as are usual or standard in the art. Multiplexer circuit 7 is responsive to timing signals from input processor 4a to provide input clocking signals to CCD registers 6a–c one at a time in a manner such that each horizontal line of processed input video is in turn clocked into one of the CCD devices with each such device temporarily storing one line of input video.

Multiplexing circuit 7 is also responsive to timing generator 10a of output processor 8a to provide output clocking signals to CCD registers 6a–c one at a time in a manner such that each horizontal line of video which was previously shifted into each CCD is in turn shifted out of each CCD. Normally, the input and output clocking is applied to the CCD's by the multiplexer circuitry such that video lines are maintained in proper number and sequence so that in effect each video line is temporarily stored in the delay 5a and then is output at a steady rate.

More specifically, operation of the multiplexer circuit is such that a 14.3 Mhz clocking signal phase locked at exactly 910 times the horizontal rate of the input video signal which clocking signal is provided by the input processor 4a is applied on one of the CCD shift registers, for example 6a, causing exactly one horizontal line of video to be shifted into that register. The device of choice for the CCD is a Plessy MS 1003 which contains an internal sample and hold circuit and 910 storage locations thus holding exactly one line of video. As soon as the multiplexer circuit has applied 910 clocks to the first CCD device (6a) the clock will be moved to the next CCD, in this example 6b, for 910 clocks, then the next CCD (6c) will receive 910 clocks after which the first CCD (6a) again receives 910 clocks and so on. Now, moving back to the time when the first CCD was being clocked assume that the multiplexer circuit was also applying 14.3 Mhz clocks, phase locked at 910 H to the output reference by output timing generator 10a, to CCD 6c thus causing previously stored video to be shifted out of the CCD. Multiplexer circuit 7 also causes output selector 19a to select the output of CCD 6c thus passing video thru low pass filter 9a to optional processing circuitry 12 and out of the TBC. After multiplexer circuit 7 has applied 910 output clocks to CCD 6c the output clock and selector 19a are moved to CCD 6a, which was previously filled with video by the input clock. When CCD 6a has received 910 output clocks the multiplexer circuit will select CCD 6b and so on. The above described clocking scheme allows video to be stored in the CCD's line by line in response to an input clocking signal phase locked to input video and thus containing all of the timing errors of the input video. Video is then clocked out of the CCD's by a stable clocking signal which may be phase locked to a reference thus transferring the video signal from unstable to stable clock. This system is similar to several manufactured devices which transfer digitized video from unstable to stable clock in digital memory requiring the use of an A-D and D-A. By using the analog CCD devices, the high cost of the A-D an D-A is eliminated.

The above described CCD system contains all of the advantages of the digital systems such as large timebase error handling capability, precise control of timing and stable, repeatable frequency response. The major problems peculiar to this technique which the digital systems do not have relate to matching of CCD devices, because these devices are analog in nature they have tolerances which affect the video signal being passed thru them. One problem is that the gain (or loss) of video amplitude and D.C. offset changes from device to device and with temperature. Referring to FIG. 2, one sees that the preferred form this invention contains a clamp and gain adjusting circuit on the output of each device as is shown by 18a–c. Note that the multiplexer circuit 7 has not been shown in clocked analog delay 5b for clarity. This circuit may be of an automatic nature, responding to a reference in the stored video such as sync, blanking, burst or other known signal which may have been added specifically for this function. Such automatic circuits to adjust for variations in gain, offset or other parameters are well known in the industry and one skilled in the art can easily adapt existing circuits to fit this application. While three separate gain and clamp circuits are shown in preferred form, it would be possible to move them to the input of the CCD devices, or to combine then into one circuit having a response time fast enough to properly adjust during blanking.

The second part of the matching problem associated with using CCD's is that the internal sample and hold timing phase varies with respect to the input clock from device to device and with temperature. This change in sampling phase is troublesome in both monochrome and color applications, as well as to other types of electronic signals. With color video signals the phase change will appear as a color hue change from line to line, commonly referred to as vector splatter, for other types of signals the artifact will be a phase difference on high frequency portions of the signal.

There are two inventive methods of correcting the above described problem. The first which is useful if the CCD temperature can be kept fairly constant is to add a small adjustable delay or phase shift network, shown by 17a–c of FIG. 2, to either the input, output or either read or write clock input to each CCD device to allow the static phase error to be matched. Of course the delay circuits could be made automatic by inspecting the timing of color burst or some other known part of the signal output from the CCD's. The second and preferred solution is to pass both input and output video thru a precision sample and hold driven from the respective clock as shown by 15 and 20 of FIG. 2. These sample and hold circuits will in essence convert the mismatched, drifting internal sample and hold circuits inside the CCD devices to a noncritical resample on the input side and a presample on the output side, thus making the timing of the video signal thru each channel unaffected by drifting or mismatching of the CCD devices. Of course if sample and hold circuits 15 and 20 are utilized, delay circuits 17a–c could be eliminated. The additional sample and hold circuits provide a very simple low cost but high performance solution to the drifting phase problem which is most troublesome.

Another problem that is associated with the use of CCD devices is that the noise generated by the CCD's will degrade the video signal. This generated noise is similar in spectral content to that found in frequency modulation systems. It is therefore useful to preemphasize the high frequency conponents of the video signal before it is passed to the CCD's and deemphasize the video after it is ouput from the CCD's.

The technical considerations for the amounts of preemphasis used are much the same as for FM videotape recording of video signals and one skilled in the art can find several circuits in the literature for use in this application. Alternately, a simple R-C or L-C high pass circuit will give quite good results, or an x/sin x compensation network can provide both preemphasis and sin x/x compensation if placed in the input video path. Of course preemphasis can be provided on a per CCD basis or in the main video signal path and the circuitry may be of an automatic type.

A further improvement of the herein described timebase corrector may be added which will allow the device to accomodate timing errors in excess of the capability of the clocked analog delay circuit. It is, of course, obvious to increase the number of CCD devices used in the analog delay circuit under the teachings of this disclosure, since all of the previous explanations may be easily applied to an analog delay having four, five or any number of clocked analog shift register paths (or CCD's). There will, however, be an optimum delay size versus cost point for any specific application. It may therefore be assumed that occasionally the input timing errors will be larger than that which can be handled by an optimum size analog delay and it would be desirable if the device can handle this condition gracefully.

FIG. 3 shows a typical schematic of part of a multiplexer circuit made by 26a and b and 27a and b. This circuit forms two counters each of which is capable of modifying its next count according to the number the other counter is on. One counter is made up of programmable memory 26b and latch 27b. Each counter's output is applied to its own input and to the other counter's input. Each counter will then count 1 2 3 1 2 3 etc., at a horizontal rate which corresponds to each CCD in delay 5b receiving 910 clock pulses, unless a condition arises which would cause a counter to advance to a number that the other counter is already at. For example, if counter a were on count 1 and counter b were on count 2 and counter a received a horizontal clock then counter a would not advance to count 2 but would hold at count 1 instead.

State diagrams 22-24 show the functioning of this counter in a situation where a timing error causes the analog memory circuit to be overranged. The input signal is assumed to be arriving slower than normal thus causing the memory to be emptied or read faster than it is filled or written into. The states shown by 22 and 24 represent the count of the counter which controls writing into CCD devices by the switching of the input clock to the CCD devices and 23 and 25 show the count of the counter which controls the reading of CCD's by switching of the output clock. Note that the write sequence is continuous counting 1 2 3 1 etc. The read sequence however, drops a count in the middle of the sequence where the input has fallen behind so far that the read counter is ready to advance to and read out of CCD 1 but CCD 1 has not been fully written into yet. The read or output counter senses this condition and causes CCD 3 to be read again thus giving time for writing to be finished in CCD 1. The opposite can happen in instances where the input is arriving too fast, the input or write counter will sense that the CCD that is to be written in next is not yet empty and will skip a count, thus causing the same CCD to be written into twice.

When used for correcting television video signals, the above described process of skipping either read or write counts will, of course, cause one horizontal line of the video signal to be either lost or repeated. When viewed on a television picture monitor the above described process will cause the picture to move up by one scan line, or move down by one scan line, depending on whether a line is deleted or repeated.

Several circuits which would most probably be included in a manufactured timebase corrector have not been discussed in this disclosure. These circuits include, but are not limited to, comb filters, synchronizing signal regeneration circuits, genlock circuits, chroma inversion circuits, noise reduction circuits, color demodulation circuits, component video processing circuits and hetrodyne color processors. The use, operation and technical requirements for these circuits as well as the design of these circuits within a timebase corrector is well known to one skilled in the art, as well as being disclosed in several patents. The present disclosure shows inventive circuitry and methods to allow one skilled in the art to overcome the problems created by the use of multiple CCD, BBD or other analog shift registers in timebase corrector type devices and is not intended to duplicate previously disclosed inventions or well known art.

Of course, the inventive concepts disclosed herein may be utilized in equipment which operates with both color and monochrome television signals as well as other types of electronic signals. While the present invention is described herein in preferred form, it is understood that numerous combinations and arrangements of circuits and components may be resorted to without deviating from the inventive concepts as hereinafter claimed.

What is claimed is:

1. A clocked analog delay circuit for use in a timing error correcting device for delaying an input analog electronic signal, including in combination: at least two clocked delay paths responsive one at a time to receive said input signal; and connected in a series fashion in each delay path a delay compensation circuit, said compensation circuit operative to allow adjustment of the delay time of each delay path in order that delay times of all said delay paths may be matched.

2. A clocked analog delay circuit as claimed in claim 1, wherein said compensation circuit is responsive to information which is part of said analog electronic signal which is output from said delay paths said compensation circuit operating to automatically perform said adjustments.

3. A clocked analog delay circuit for use in a timing error correcting device for delaying an input analog electronic signal including in combination at least two clocked delay paths responsive one at a time to receive said input signal and connected in a series fashion in each delay path a gain compensation circuit operative in response to said delayed input signal to allow adjustment of the output signal amplitude relative to the input signal amplitude of each delay path in order that the output signal amplitude of all said delay paths may be matched.

4. A clocked analog delay circuit for delaying an input analog electronic signal including in combination at least two clocked delay paths responsive one at a time to a clocking signal to receive said input signal to be delayed therein including in combination for each said delay path a delay compensating circuit operative to provide said clocking signal with adjustable timing for each said delay path thereby operating to adjust the timing of said electronic signal which is output from said delay paths.

5. A clocked analog delay circuit for delaying an input analog electronic signal including in combination at least two clocked delay paths responsive one at a time to clock in said input signal and a phase compensating circuit connected in a series fashion in each delay path to allow adjustment of the phase response of each delay path in order that said phase responses may be substantially equal.

6. A clocked analog delay circuit as claimed in claims 4 or 5 wherein said compensating circuit operates in an automatic fashion in response to said analog electronic signal output from said delay paths.

7. A device for correcting timing errors on an analog electronic signal including in combination a sample circuit to sample said signal in response to a clocking signal containing timing errors of said analog signal a clocked analog delay circuit containing at least two clocked delay paths responsive one at a time to said sample circuit and said clocking signal to store samples of said analog electronic signal which clocked delay paths operate to ouput stored samples in response to a stable clocking signal derived from a stable reference.

8. A device as claimed in claim 7 including a second sample circuit responsive to said stable clocking signal to sample said stored samples which are output and a low pass filter circuit to filter samples output from said second sample circuit.

9. A device for correcting timing errors on an analog electronic signal, including in combination: an input processing circuit responsive to said electronic signal to provide a clocking signal containing the same timing errors as said electronic signal; a clocked analog delay circuit having a sample and hold circuit responsive to said analog electronic signal, and having at least two clocked analog delay paths, each responsive to said sample and hold, with said analog delay circuit continuously responsive to said analog electronic signal and said clocking signal to store samples of said electronic signal in one said delay path at a time; and an output processing circuit to provide an output clocking signal to said clocked analog delay, which delay outputs previously stored samples in response to said output clocking signal; and a low pass filter circuit operative to filter said stored samples which are output to remove output clocking signal components, thus restoring said analog electronic signal.

10. A device as claimed in claim 9 including in combination; delay matching circuitry operative to adjust the delay times of said clocked analog delay paths in order that said times will be substantially matched.

11. A device as claimed in claim 9 or 10 including in combination; a gain correcting circuit operable to correct for gain differences in said clocked analog delay paths.

12. A device as claimed in claim 8 or 10 including in combination; an automatic gain correcting circuit responsive to stored samples output from said clocked analog delay paths to correct for gain differences in said paths.

13. A device as claimed in claim 9, wherein said clocked analog delay paths include charge coupled devices.

14. The method of correcting timing errors on an analog electronic signal including the steps of: sampling said signal with a sampling circuit at a rate responsive to the frequency of synchronizing information in said signal; storing samples of said signal from said sampling circuit in a first clocked analog delay; changing said storing of said samples from said sampling circuit from said first clocked analog delay to another analog delay when the first is full; the step of retrieving previously stored samples from said first clocked analog delay at a rate responsive to a stable reference; changing from said first clocked analog delay to another clocked analog delay when said first delay is empty, so as to continue retrieving samples, with said changing from delay to delay being done such that samples are taken out of delays in the same order as they are stored.

15. The method as claimed in claim 14 including; the step of correcting samples retrieved from each delay in order that they are adjusted to compensate for differences in gain in each delay.

16. The method as claimed in claim 14 including; the step of delaying the samples retrieved from each delay in order that differences in delay clocking phase are compensated.

17. The method as claimed in claim 14 including; the step of increasing the amplitude of the high frequency portion of the analog electronic signal before sampling and decreasing the amplitude of the same high frequency portion after said signal has been delayed in order to reduce high frequency noise added to said signal by said delays.

18. The method as claimed in claim 14, 15, 16 or 17, wherein said analog electronic signal is a television video signal and including the step of automatically delaying said signal to ensure correct chroma phase will be maintained at the output of said delays.

* * * * *